(12) United States Patent
Sharrow et al.

(10) Patent No.: US 7,767,335 B2
(45) Date of Patent: Aug. 3, 2010

(54) HIGH-VOLTAGE BATTERY SWITCH

(75) Inventors: Joseph F. Sharrow, Fredericksburg, VA (US); Frank E. Peterkin, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1097 days.

(21) Appl. No.: 11/447,514

(22) Filed: Jun. 2, 2006

(65) Prior Publication Data
US 2007/0059591 A1 Mar. 15, 2007

Related U.S. Application Data

(63) Continuation-in-part of application No. 10/457,698, filed on May 16, 2003, now Pat. No. 7,108,940.

(51) Int. Cl.
*H01M 6/42* (2006.01)
*H01H 3/14* (2006.01)
*H01H 19/20* (2006.01)

(52) U.S. Cl. ............... 429/156; 200/52 R; 200/570

(58) Field of Classification Search ............. 429/156; 200/52 R, 570
See application file for complete search history.

(56) References Cited

U.S. PATENT DOCUMENTS

| 4,563,627 A | 1/1986 | Orban ............... 320/112 |
| 4,957,829 A | 9/1990 | Holl ................. 429/99 |
| 5,140,744 A | 8/1992 | Miller ............... 29/730 |
| 5,162,164 A * | 11/1992 | Dougherty et al. ..... 429/9 |
| H1422 H | 3/1995 | Walker, Jr. et al. ..... 429/342 |
| 5,486,432 A | 1/1996 | Sharrah et al. ........ 429/99 |
| 5,496,657 A | 3/1996 | Dixon, Jr. ............ 429/62 |
| 5,589,291 A | 12/1996 | Carlin et al. ......... 429/103 |
| 5,709,964 A | 1/1998 | Christensen et al. ... 429/153 |
| 6,027,828 A | 2/2000 | Hahn ................. 429/100 |
| 6,265,091 B1 | 7/2001 | Pierson et al. ........ 429/1 |
| 6,265,100 B1 | 7/2001 | Saaski et al. ......... 429/163 |
| 6,597,156 B2 | 7/2003 | Gogolla .............. 323/224 |

(Continued)

OTHER PUBLICATIONS

"Battery Contact Probes", Interconnect Devices, Inc., *Battery Contacts* catalog p. 2.

*Primary Examiner*—Patrick Ryan
*Assistant Examiner*—Karie O'Neill Apicella
(74) *Attorney, Agent, or Firm*—Gerhard W. Thielman, Esq.

(57) ABSTRACT

A battery assembly is provided for electrical concatenation in series. The battery assembly includes a plurality of battery packs; a switch; a receiver; and an actuator. Each battery pack includes a plurality of rechargeable battery cells electrically connected in series. The switch electrically connects and disconnects first and second battery packs together. The receiver transmits power from the switch. The actuator operates the switch to connect and disconnect the battery packs. In preferred embodiments, the switch includes first and second buses and a deflector. The first bus electrically contacts the first battery pack. The second bus electrically contacts the second battery pack. The deflector moves the first bus electrically connect and disconnect with the second bus in response to communication with the actuator. An electrical connector is further provided for mechanical engagement and disengagement of electrical conduction to a terminal. The connector includes a block and a plurality of contacts. The block includes a plurality of openings. Each contact is disposed into a corresponding opening in the block.

6 Claims, 18 Drawing Sheets

U.S. PATENT DOCUMENTS

| | | |
|---|---|---|
| 6,770,398 B1 | 8/2004 | Atwater et al. ............... 429/224 |
| 2002/0136946 A1 | 9/2002 | Amatucci et al. ............ 429/152 |
| 2005/0136329 A1 | 6/2005 | Howard, Jr. et al. ......... 429/233 |

* cited by examiner

HIGH-VOLTAGE BATTERY SWITCH

CROSS REFERENCE TO RELATED APPLICATION

The invention is a Continuation-in-Part of, claims priority to and incorporates by reference in its entirety U.S. patent application Ser. No. 10/457,698 filed May 16, 2003, titled "Battery Mechanism" to Joseph F. Sharrow, Kurt W. Solomon, Frank E. Peterkin, Jack S. Bernandes and Brian J. Hankla, and assigned Navy Case 832237.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to the battery mechanisms, and more particularly to such mechanisms that preferably can safely, reliably and remotely combine multiple battery assemblies.

High-powered electrical devices at least occasionally require portable operation. This means that the devices must be able to be used off battery power. Such high-powered electrical devices include those used in pulsed power systems, which may find applicability in both military and non-military scenarios.

The high voltage needed to power the electrical devices means that battery packs which power such electrical devices must themselves be able to provide high voltage. Such high-voltage battery packs are inherently dangerous, however. Incorrect installation or assembly of the battery packs, or defective battery packs, can potentially severely injure personnel or even cause fatalities.

SUMMARY

Conventional battery assemblies yield disadvantages addressed by various exemplary embodiments of the present invention. In particular, various exemplary embodiments provide a battery assembly for safe and controllable electrical concatenation in series. The battery assembly includes a plurality of battery packs, a switch, a receiver, and an actuator.

In various exemplary embodiments provide for each battery pack to include a plurality of rechargeable battery cells electrically connected in series. The switch electrically connects and disconnects first and second battery packs of the plurality together. The receiver transmits power from the switch. The actuator operates the switch to connect and disconnect the battery packs.

In preferred embodiments, the switch includes first and second buses and a deflector. The first bus electrically contacts the first battery pack. The second bus electrically contacts the second battery pack. The deflector moves the first bus to electrically connect and disconnect with the second bus in response to communication with the actuator.

An electrical connector is further provided for mechanical engagement and disengagement of electrical conduction to a terminal. The connector includes a block and a plurality of contacts. The block includes a plurality of openings. Each contact is disposed into a corresponding opening in the block.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Conventional battery power switching mechanisms lack capabilities of scalable connectivity with multiple battery cell packs that provide reasonable levels of safety for personnel for installation and other pre-activation operations. Various exemplary embodiments address these limitations.

Figure 1:
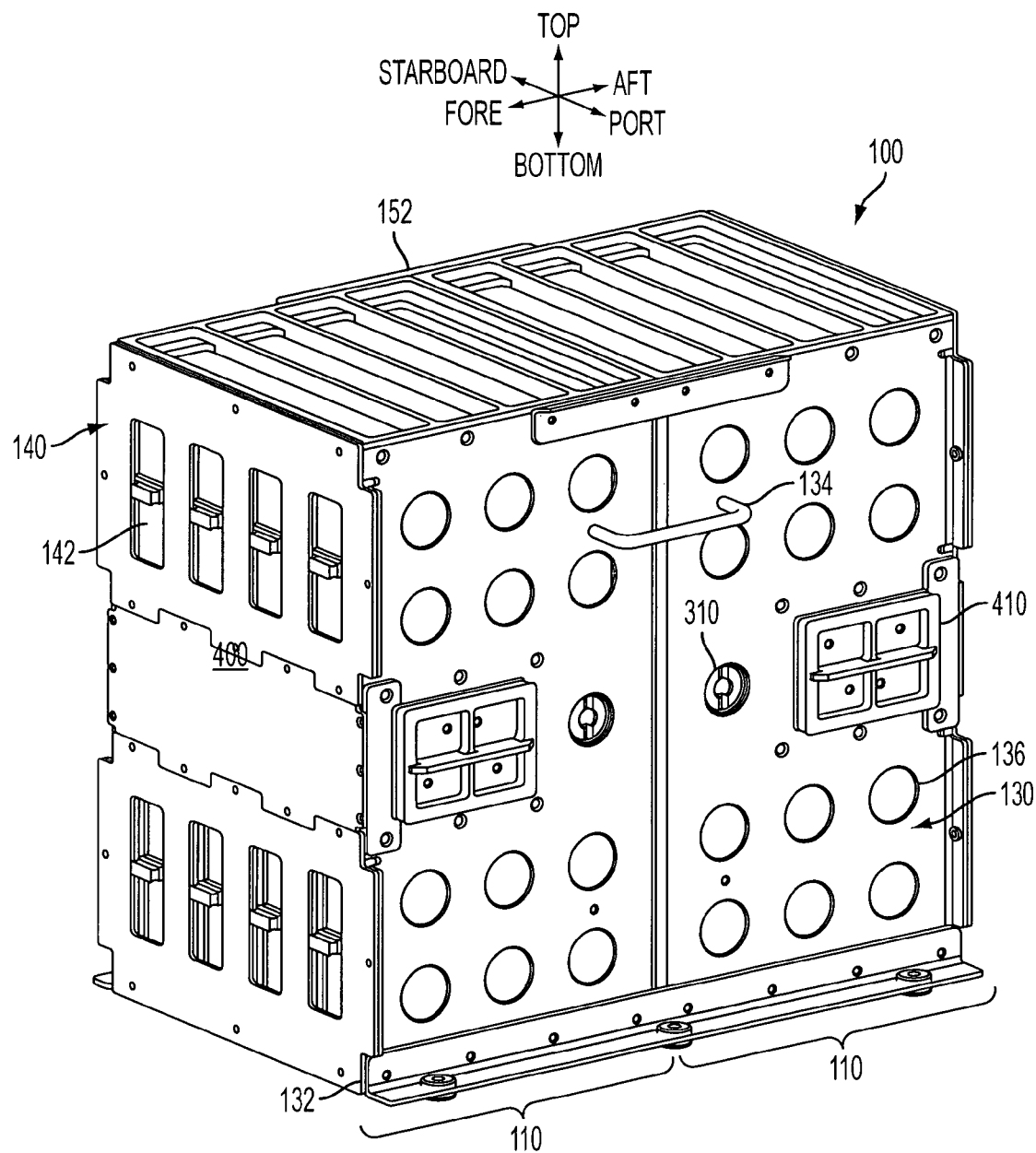
FIG. 1 is an isometric view of a battery assembly with the front battery unit shown from the port side, as exemplified by a compass-rose.
Figure 2:
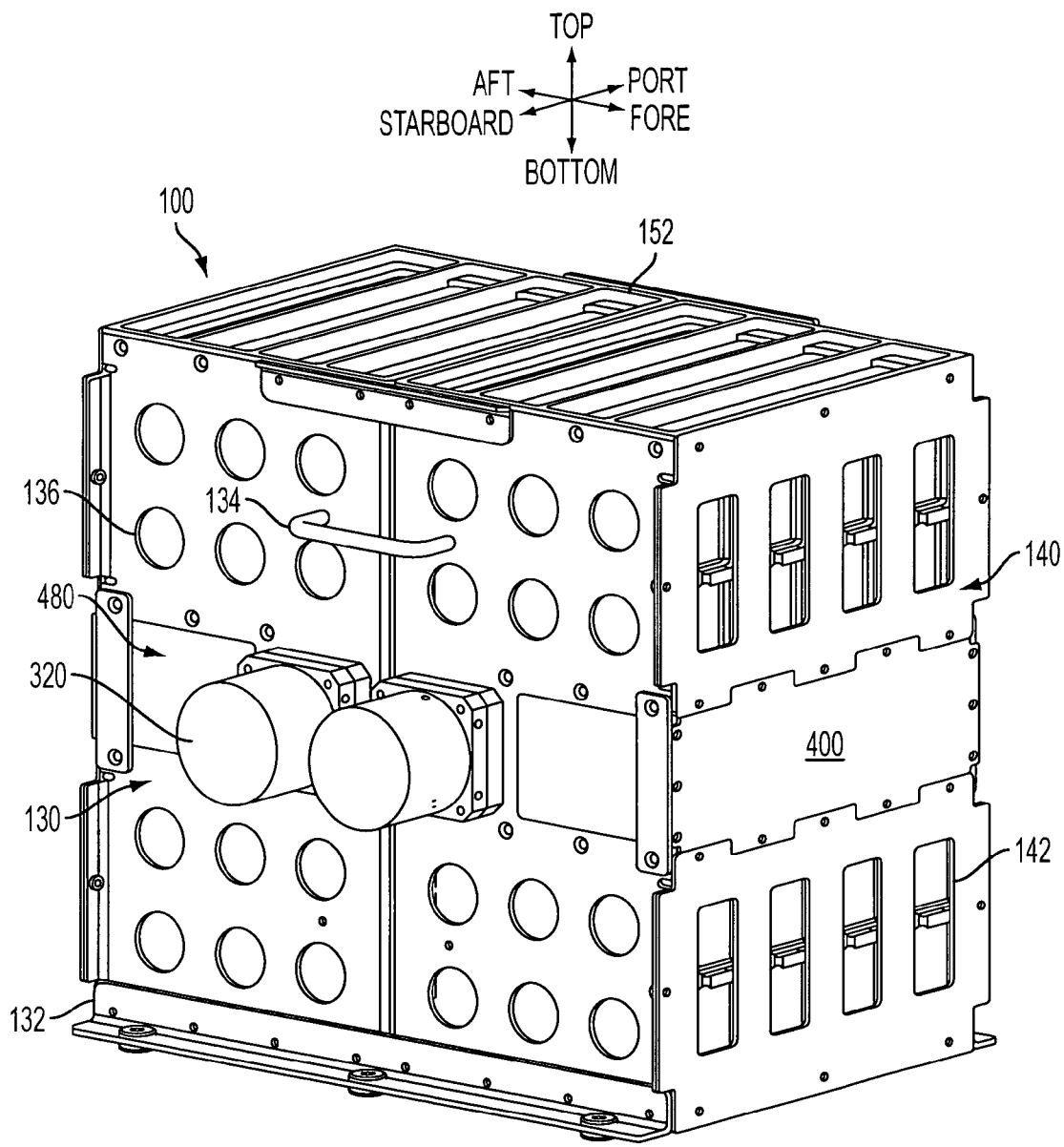
FIG. 2 is an isometric view of the battery assembly with the front battery unit shown from the starboard side.

A battery assembly 100 including a pair of battery units 110 is illustrated in isometric view in FIGS. 1 and 2 shown from port (left) and starboard (right) sides, respectively, of the front battery unit's perspective, as illustrated with a compass-rose. Each battery unit 110 includes a pair of cell section packs 120 (shown in FIGS. 3 and 4) disposed at top and bottom. Except for orientation in relation to the drawings, the front and rear battery units 110 may be identical.

The illustrated configurations show the battery assembly 100 having the pair of fore and aft back-to-back pairs of battery units 110. The configuration of each displayed battery unit 110 provides the pair of top and bottom section packs 120. As will be apparent to those of ordinary skill, the embodiments illustrated and described in detail herein are exemplary only and do not limit the scope of the invention.

The battery assembly 100 may include an aluminum (Al) enclosure that mechanically couples the battery units 110 back-to-back. The battery units 110 may include a complementary pair of enclosure plates 130 for the respective port and starboard sides.

The enclosure may include a pair of mounting elbows 132 for installation and a pair of handles 134, one each on the port and starboard sides. Each enclosure plate 130 may incorporate a plurality of portholes 136 thereon.

An aluminum cover plate 140 may protect the section pack 120 on its fore side. The cover plate 140 may include windows 142 that show portions of battery subpacks described further herein infra.

Figure 3:
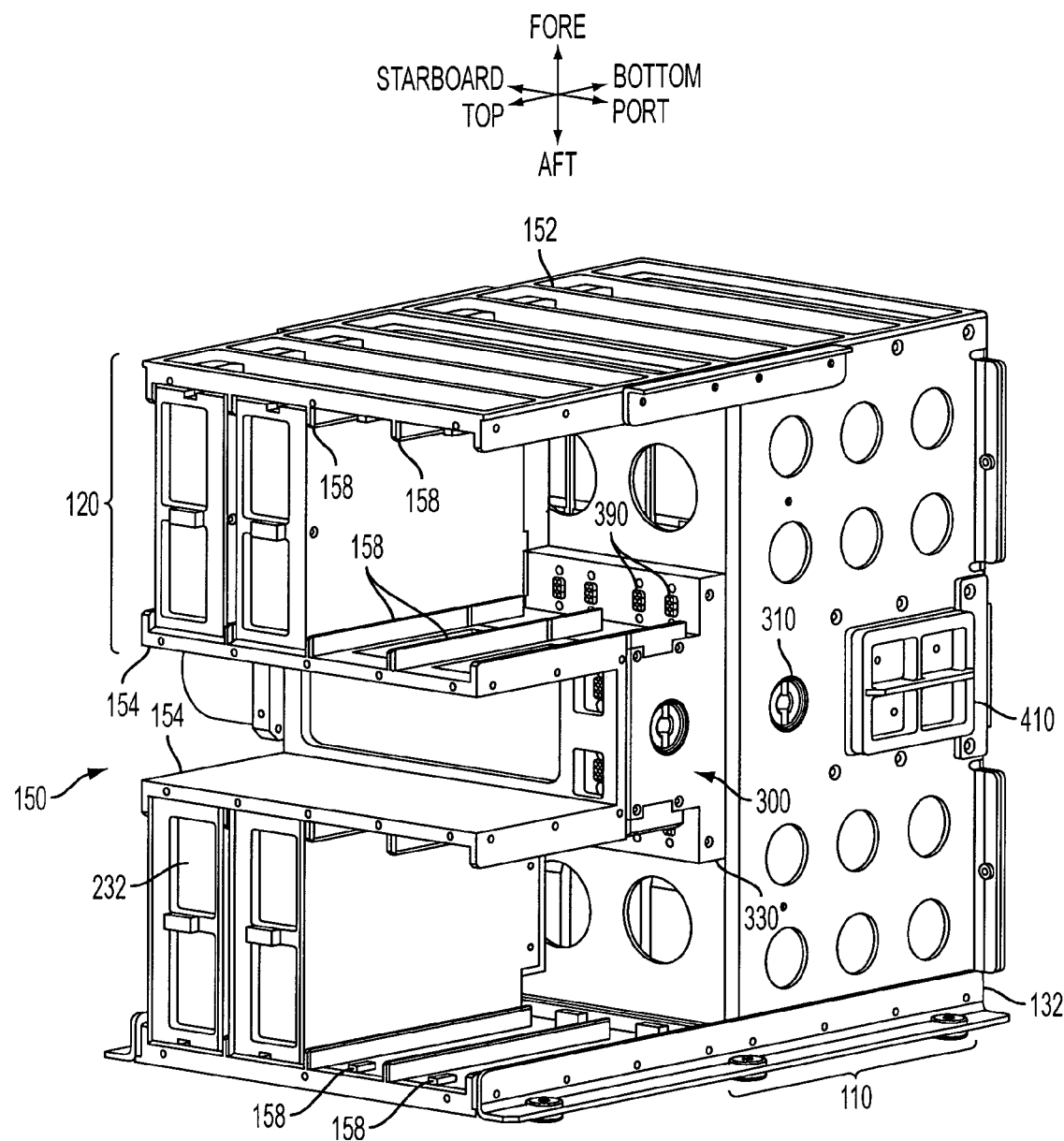
FIG. 3 is an isometric view of the battery assembly from the perspective of FIG. 1 with power conditioner and four battery packs removed.

FIG. 3 illustrates the battery assembly 100 with the enclosure plate 130 and four subpacks removed from the front battery unit 110 for improved clarity. A central enclosure 150 straddles between the top and bottom section packs 120.

The central enclosure 150 includes an outer plate 152 at top and bottom ends of the battery unit 110 and a central support 154. Parallel rails 156 may be aligned fore and aft along the plate 152 and the support 154 to guide and maintain subpack assemblies 200 disposed therebetween. Each plate 152 may further include a slot key 158 to orient the subpack assemblies 200 for insertion.

Consequently, the subpack assemblies 200 may be disposed in linear groupings, as shown in these exemplary embodiments, to facilitate controllable connectivity as well as to minimize encumbered volume. However, as artisans of ordinary skill will be aware, other arrangements may be contemplated without departing from the scope of the claims. Each subpack assembly 200 contains a plurality of battery cells, as described in further detail herein infra.

Figure 4:
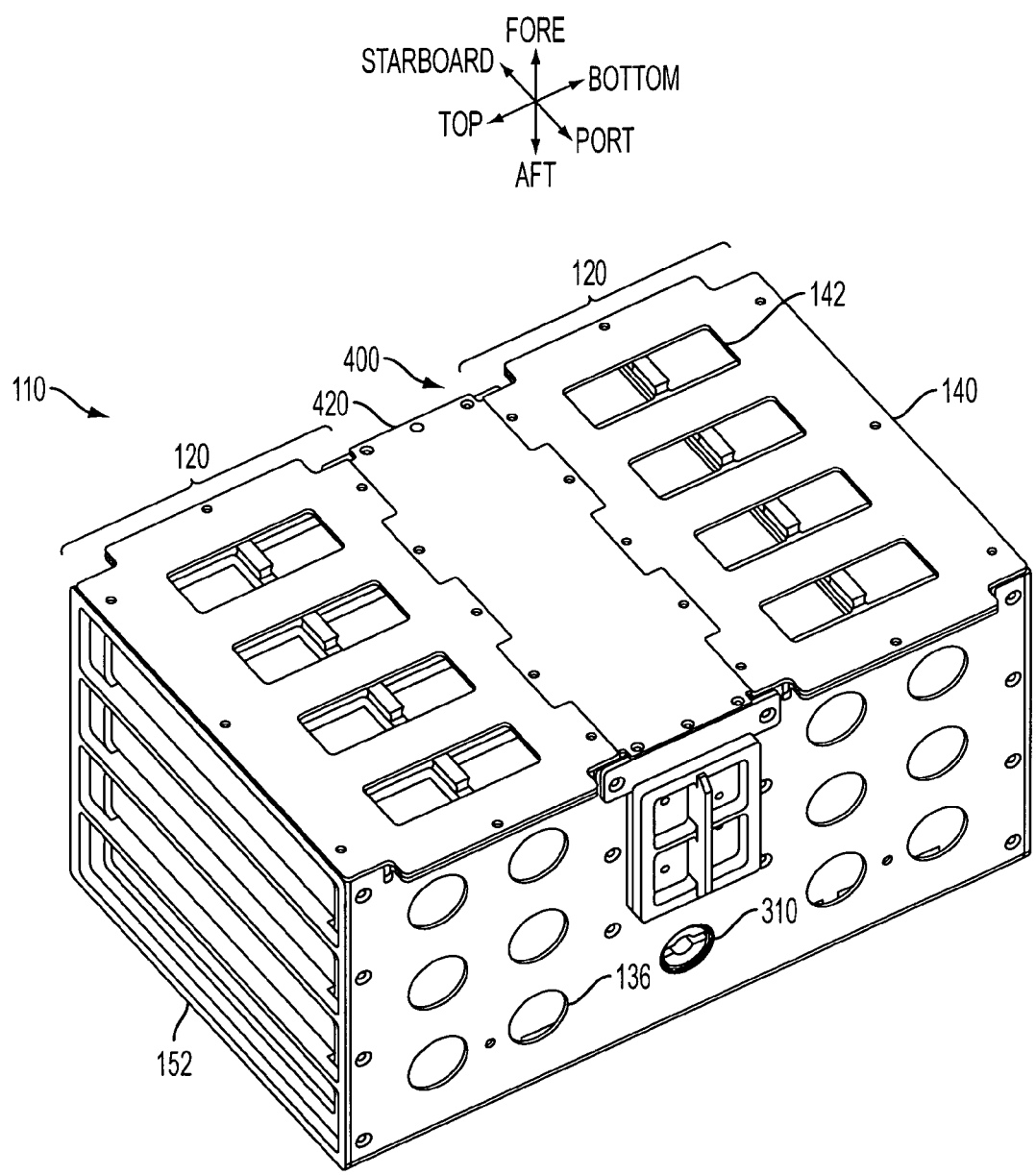
FIG. 4 is an isometric view of the front battery unit shown from the fore and port sides.

FIG. 4 shows the front battery unit 110 isolated from the battery assembly 100. As shown, the battery unit 110 includes two section packs 120 separated by the central enclosure 150 (shown in FIG. 3).

Figure 5:
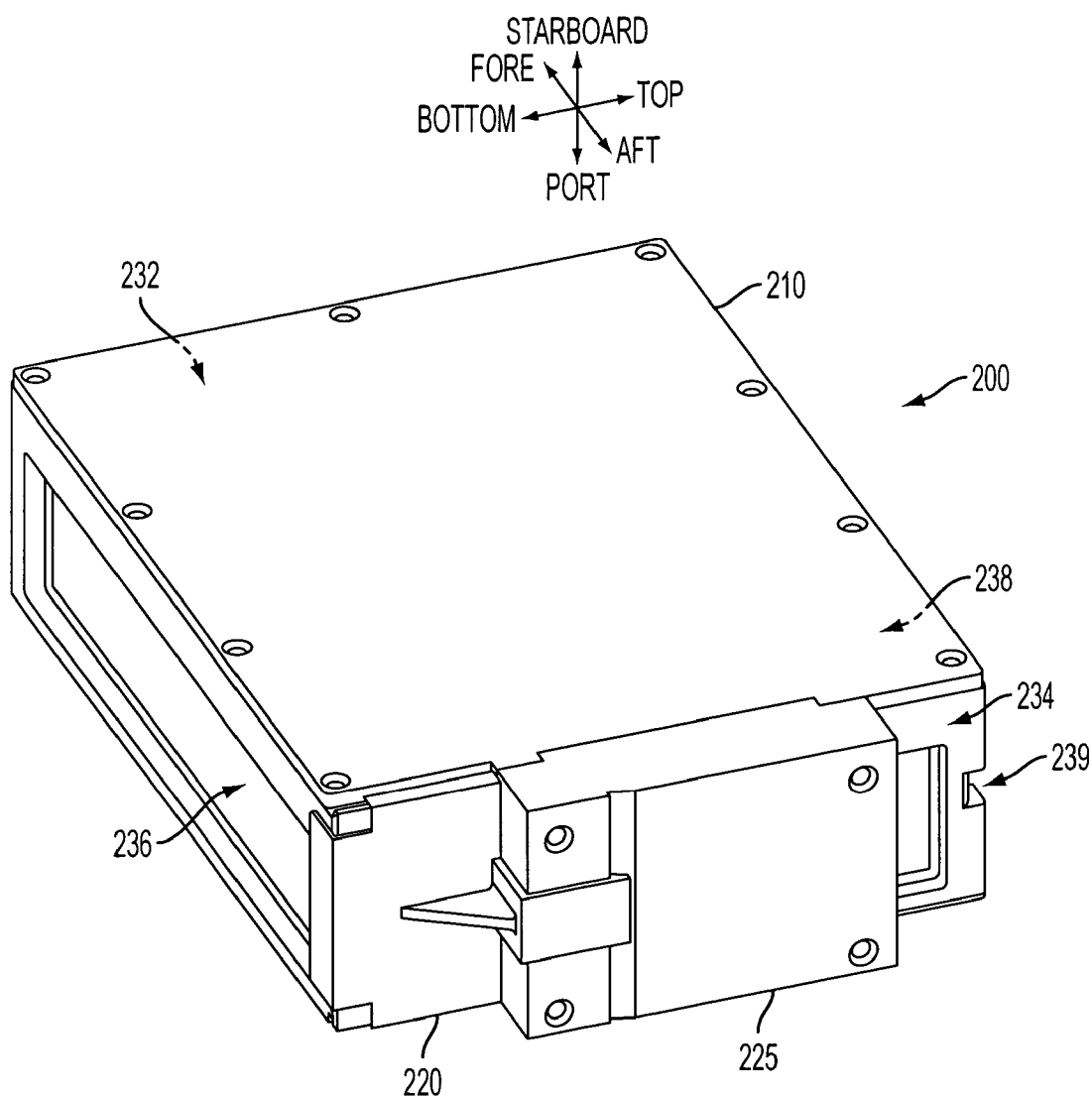
FIG. 5 is an isometric view of a battery pack shown from the aft side of the front battery unit.
Figure 6:
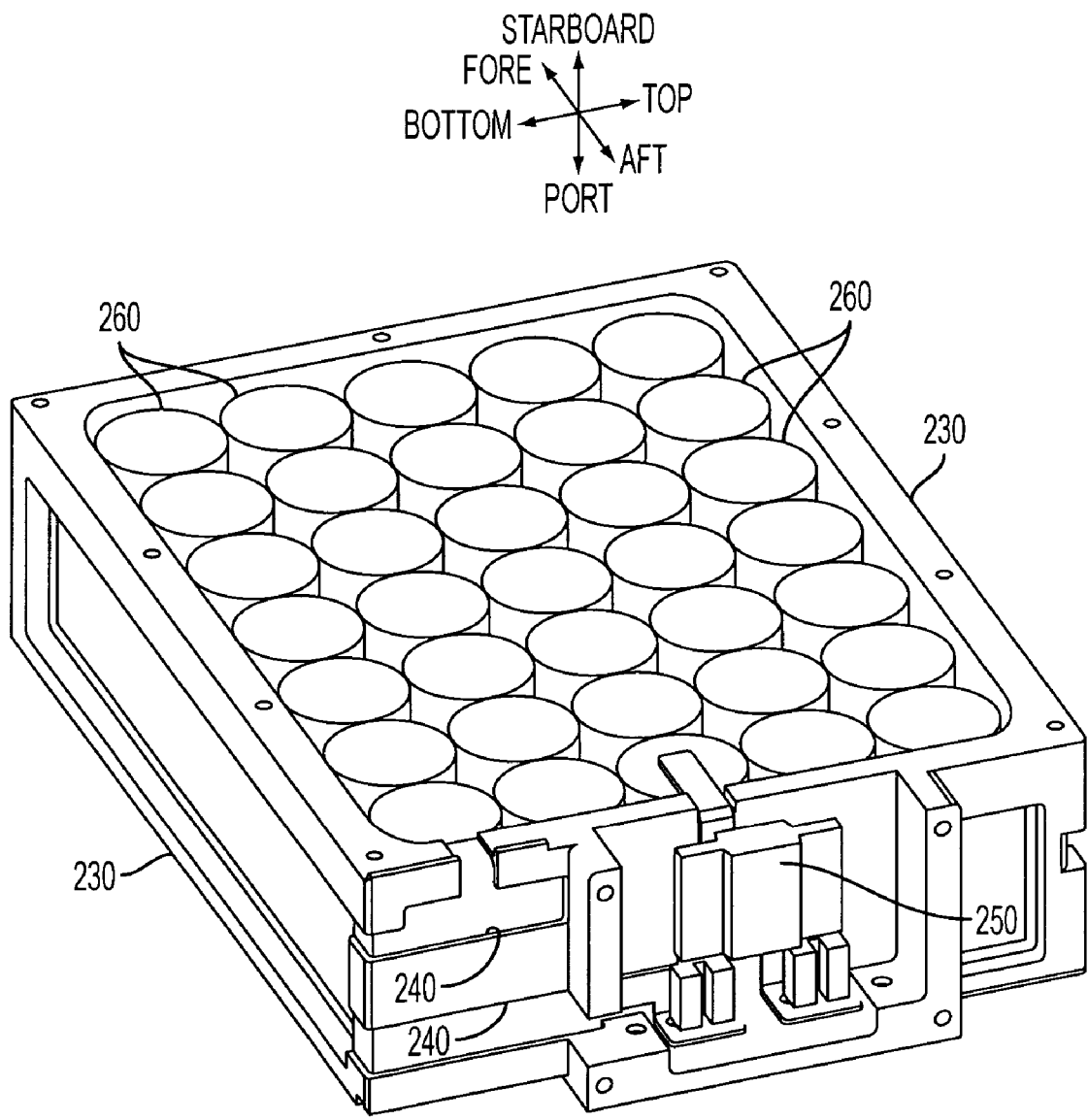
FIG. 6 is an isometric view of the battery pack from the perspective of FIG. 5 with plastic, safety and fuse covers removed.

FIG. 5 illustrates an isolated subpack assembly 200 oriented in relation to the front battery unit 110. A plastic cover 210 is disposed to protect the cells disposed within. Safety and fuse covers 220, 225 are disposed to protect aft facing electrical connections. FIG. 6 shows the subpack assembly 200 with the covers 210, 220, 225 removed for clarity.

A plastic tray 230 contains electrical power storage components, described in further detail herein. The tray 230 includes a fore wall 232, an aft wall 234, a bottom (inboard) wall 236 and a top (outboard) wall 238. A portion of the fore wall 232 may be observed through the window 142 in FIG. 4. The safety cover 220 may slide from the bottom side and latches to the fuse cover 225.

The top wall 238 may include a groove 239 that aligns with the slot key 158 on the outer plate 152 for inserting the subpack assembly 200 into the section pack 120. The aft wall 234 may include terminals 240 and a blade-type fuse 250 beneath the fuse cover 225. Each subpack 200 is readily removable from the section pack 120 for recharging at a separate equipment station.

The tray 230 may contain a plurality of rechargeable nickel-cadmium (NiCd) cells 260 for storing electrical energy. The cells 260 may be arranged in a 5×7 rectangular planar array, as shown. These thirty-five cells 260 may be connected in series to concatenate their individual voltage contributions for greater power than available from a single cell. Each cell 260 may provide 1.25 $V_{DC}$ (volts-direct current), for a total of 43.75 $V_{DC}$ available from each subpack assembly 200.

Figure 7:
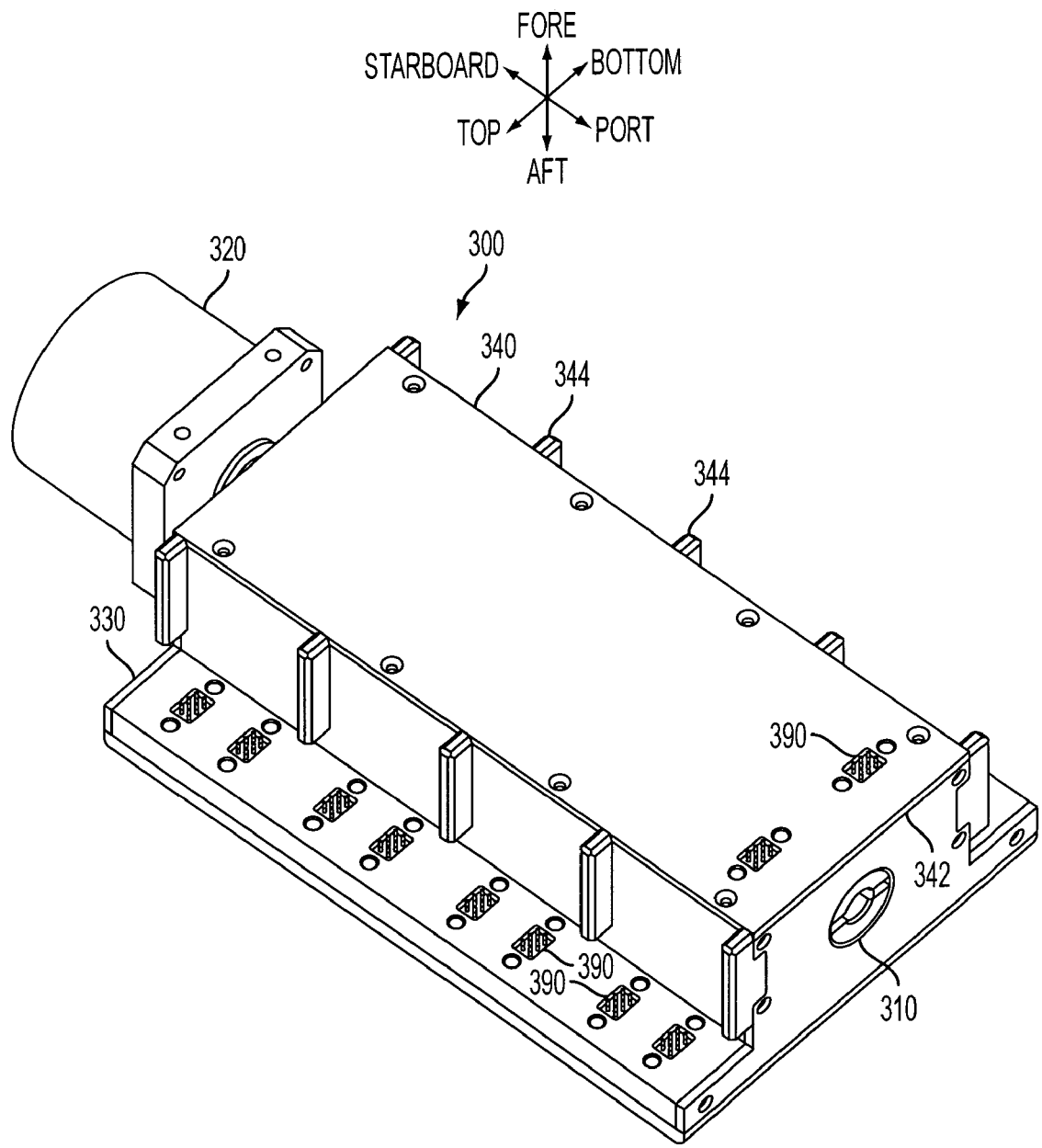
FIG. 7 is an isometric view of a switch assembly shown from the fore side of the front battery unit.

FIG. 7 illustrates a switch assembly 300 in greater detail, as nominally depicted in FIG. 3. On the port side, the switch assembly 300 connects to a keyhole 310 for manual engagement or disengagement. On the starboard side, the switch assembly 300 connects to a pneumatic actuator 320 for electrically or pneumatically commanded engagement or disengagement. The pneumatic actuator 320 is exemplary only, and other actuators may be employed.

The switch assembly 300 incorporates a base 330 and a housing 340. A cover plate 342 protects internal components contained within the housing 340. Support posts 344 contribute structural integrity to the housing 340 along the longitudinal sides and provide continuation of the rails 156 (FIG. 3).

Figure 8:
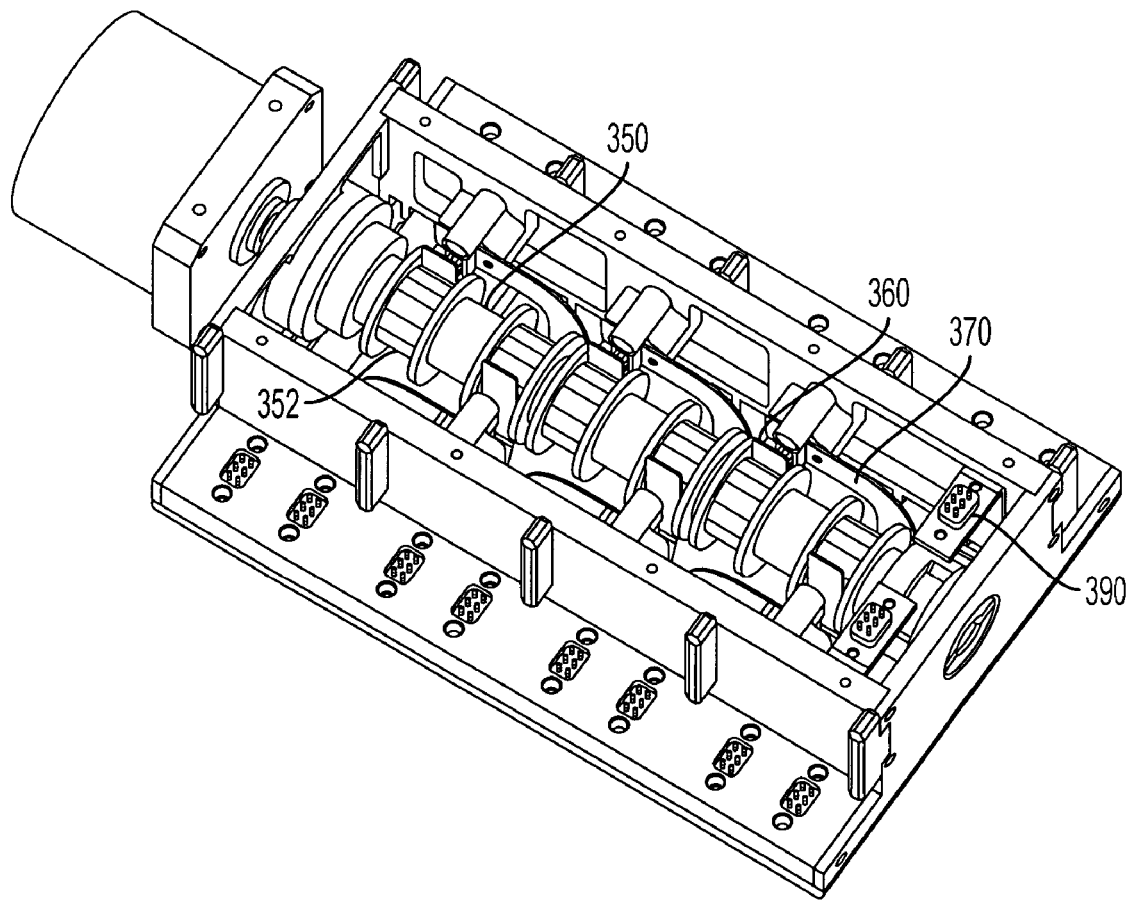
FIG. 8 is an isometric view of the switch assembly from the perspective of FIG. 7 with cover plate removed.

FIG. 8 shows the switch assembly 300 without the cover plate 342. Within the housing 340, the switch assembly 300 includes a shaft 350 extending between the keyhole 310 and the actuator 320 and rotating around its longitudinal axis along the port-to-starboard direction. The pneumatic actuator 320 operates at about 100 psi (pounds-per-square inch) to rotate the shaft 350 on command.

A plurality of cams 352 (with six shown in the exemplary configuration) may be disposed to rotate with the shaft 350. Counterpart pluralities of beryllium-copper (BeCu) leaf springs 360 and brass busbars 370 may be disposed adjacently outward (top and bottom) from the corresponding cams 352 within the housing 340.

Figure 9:
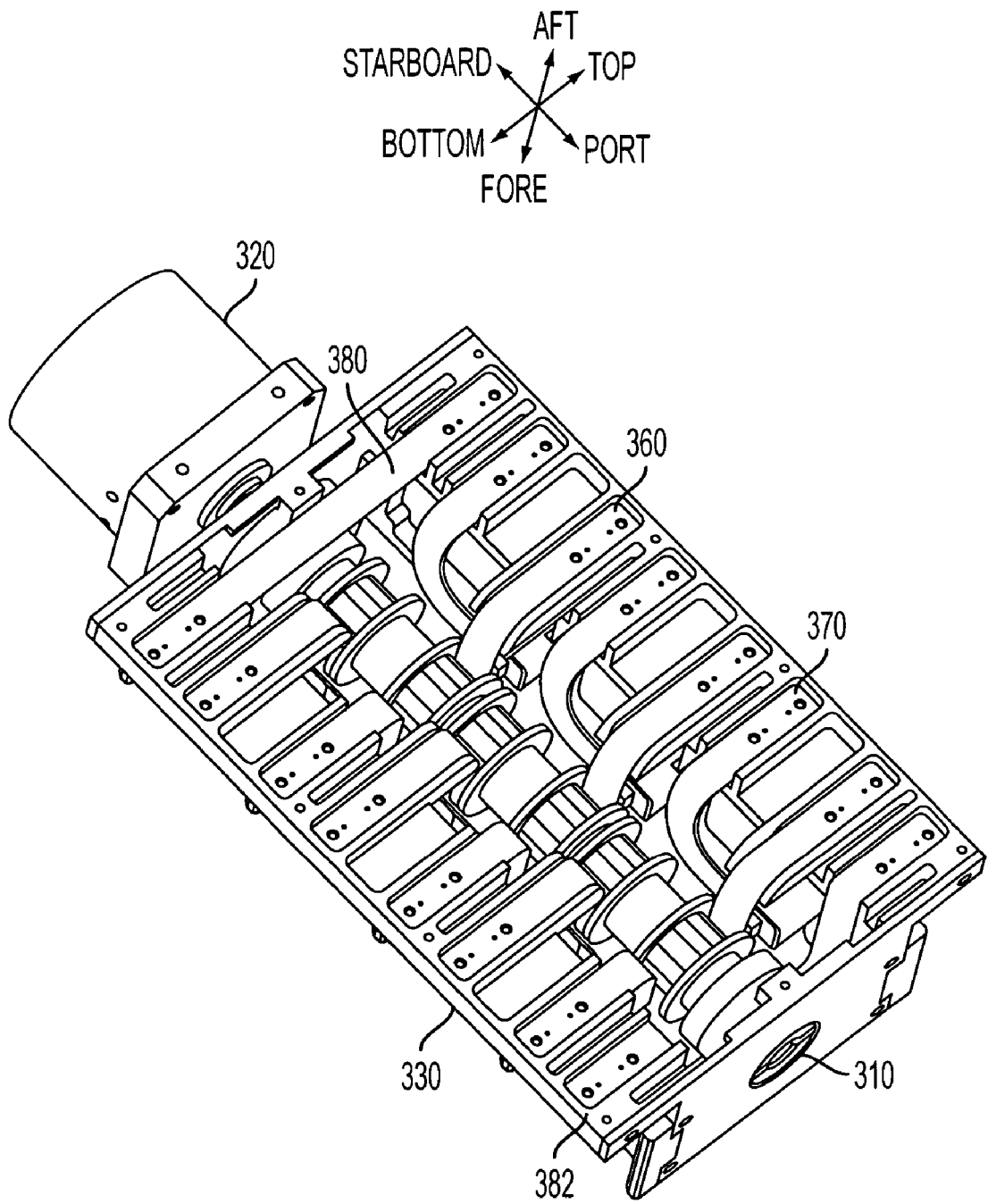
FIG. 9 is an isometric view of the switch assembly shown from the aft side of the front battery unit.

FIG. 9 shows the switch assembly 300 from the aft side. A secondary busbar 380 may connect two subpack assemblies 200 in the top and bottom assembly sections at the starboard side of the front battery unit 110, for example. A tertiary busbar 382 may connect these subpack assemblies 200 at the port side of the front battery unit 110, for example.

Returning to FIG. 7, a plurality of spring connectors 390 may be disposed along the base 330 (along the port-starboard axis) and neighboring the port end of the housing 340. Except for their respective positions and orientations, the connectors 390 may all be identical to each other.

A positive and negative pair of connectors 390 may correspond to the each of four subpack assemblies 200 (forming a quad) in the top section pack 120, as shown on the base 330 (FIG. 3). A complementary pair of connectors 390 may similarly be distributed for a subpack quad in the bottom section pack 120, but are obscured in FIG. 7 by the housing 340.

Figure 10:
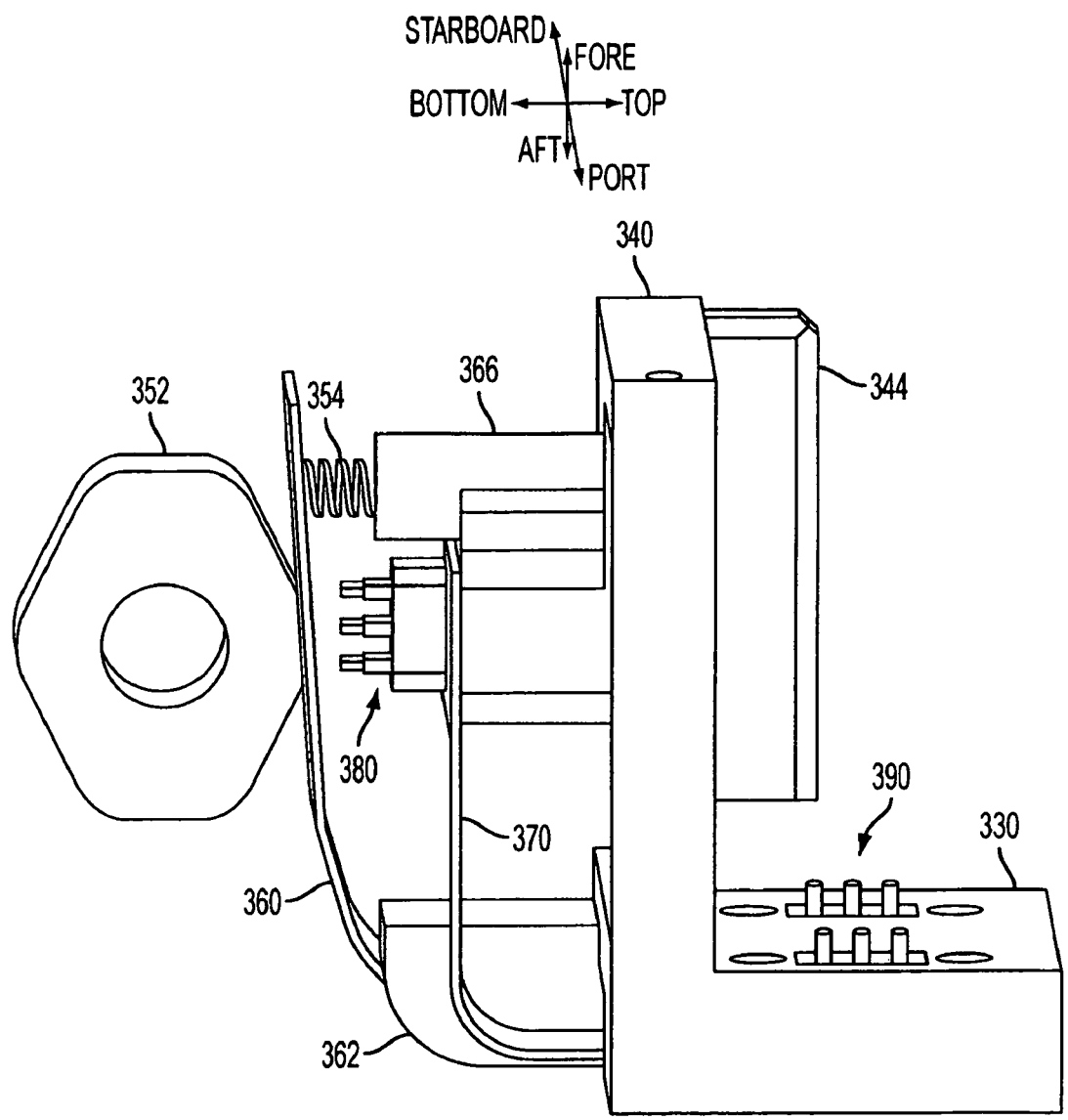
FIG. 10 is an isometric view of a switch mechanism, including a cam, in the switch assembly shown from the port side of the front battery unit.
Figure 11:
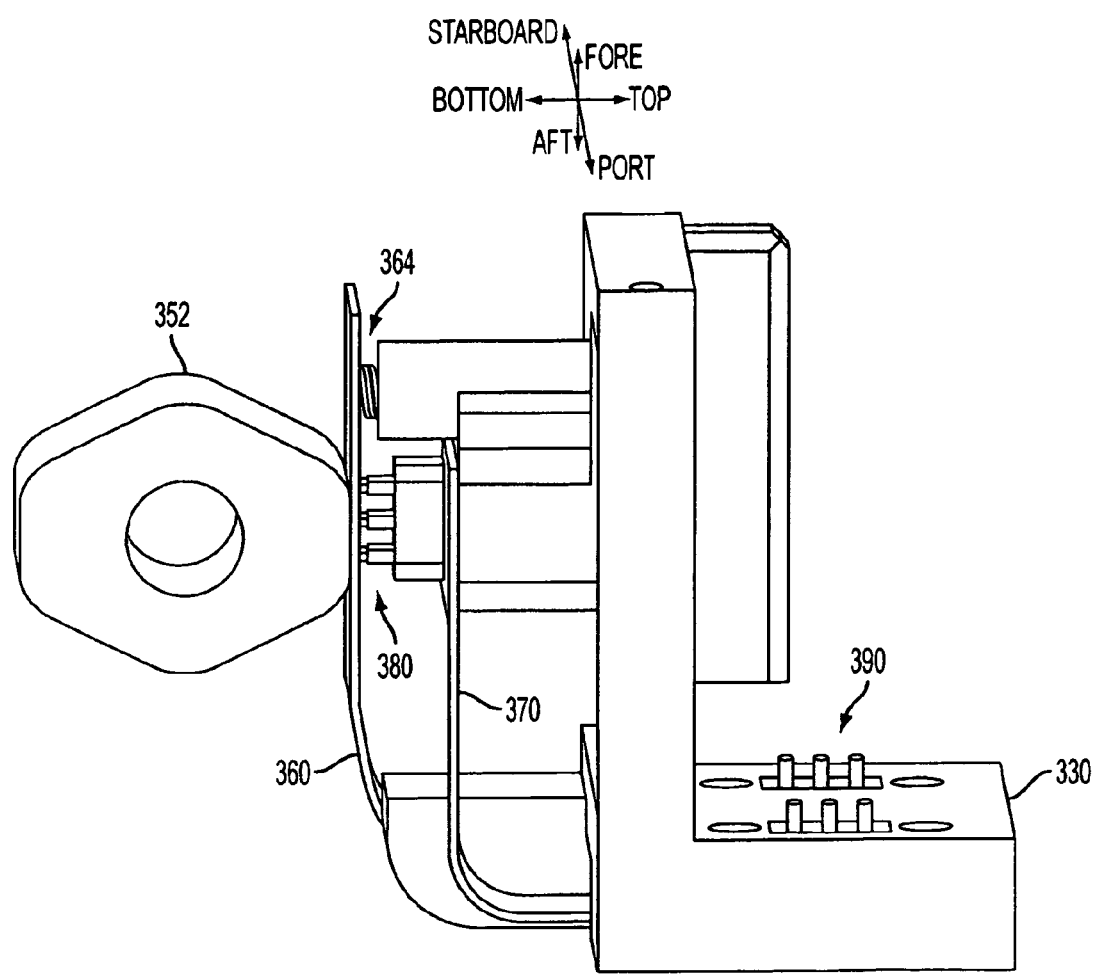
FIG. 11 is an isometric view of a switch mechanism from the perspective of FIG. 10 with the cam rotated.

FIGS. 10 and 11 illustrate operation of a switching mechanism within the switch assembly 300, showing a portion of the base 330 and the housing 340. This portion is depicted from the vantage of the port side of the front battery unit 110. Contained within this portion are one of the pairs of connectors 390 disposed on the base 330 and one of the support posts 344 on the housing 340.

From the base 330 at the starboard end of the shown portion, one of the springs 360 extends towards the top and may flex along the top-to-bottom direction. In the exemplary embodiments described, the busbar 370 may be comparatively stiffer than the spring 360. The spring 360 may be partially shrouded by a leaf spring mount 362 connected to the base 330.

Beyond the mount 362, the spring 360 bends towards the fore end, extending beyond one of the cams 352 and a helical spring or coil 364. The spring 360 may be interposed between the cam 352 and the connector 390 disposed on the busbar 370. The coil 364 may extend towards the top, shrouded by a hollow cylinder 366 connected to the housing 340.

Figure 12:
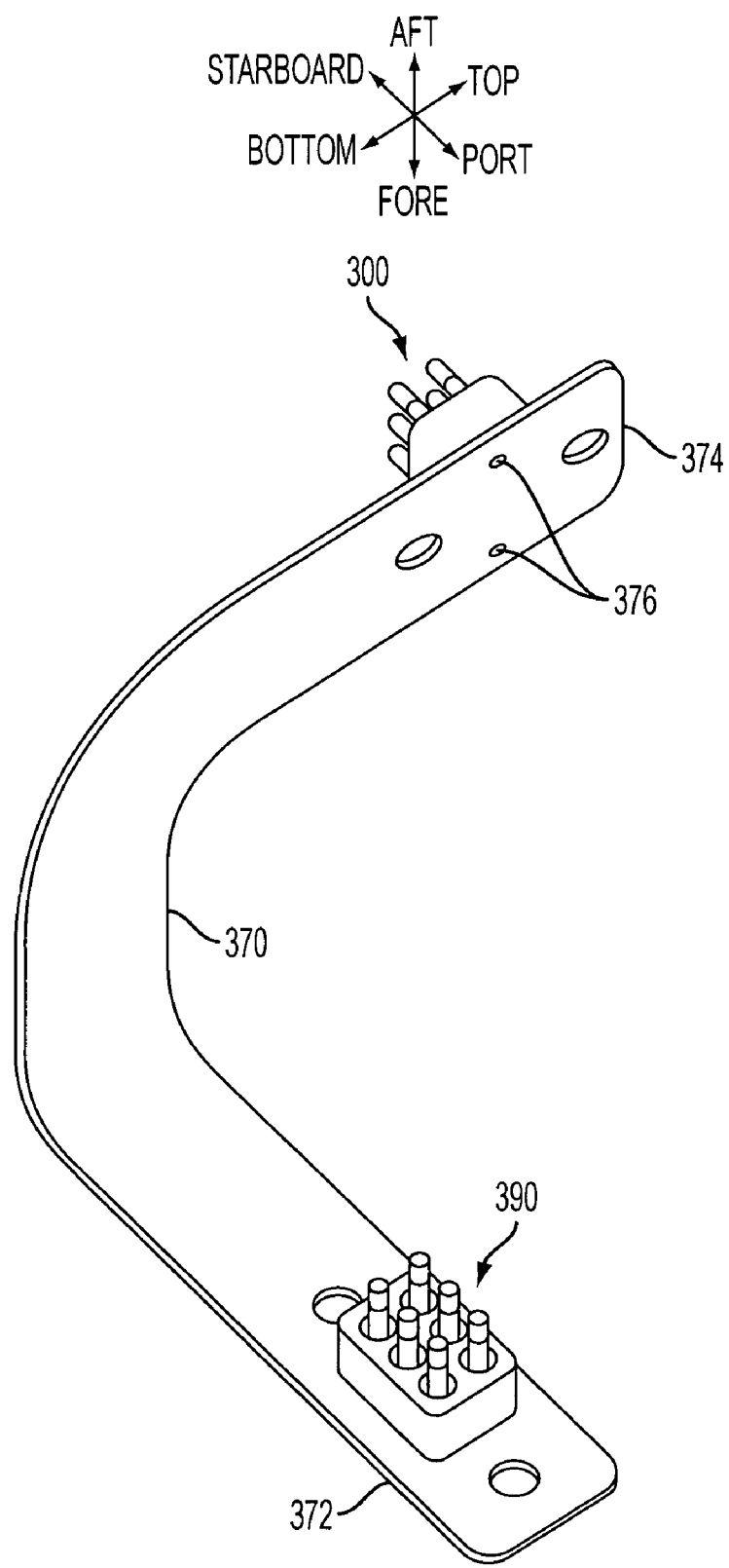
FIG. 12 is an isometric view of a brass busbar in the switch mechanism with a pair of contact assemblies.

Also from the base 330 at the port end of the shown portion, one of the busbars 370 extends from its lower portion 372 (FIG. 12) towards the top. This busbar 370 bends towards the fore end and then extends towards starboard, with one of the connectors 390 disposed at the busbar's free end at its upper portion 374 (FIG. 12).

FIG. 10 depicts the cam 352 with its major axis aligned along the fore and aft direction from the perspective of the front battery unit 110. The cam 352 exhibits radial extensions or ridges or lobes (aligned with the cam's major axis) that smoothly transition from radial depressions or valleys. With the cam 352 having the lobes in this relative "vertical" position, the spring 360 and the coil 364 remain at rest (in relaxation) to inhibit un-commanded connection with the busbar's connector 390.

FIG. 11 depicts the cam 352 with its major axis aligned along the top and bottom direction from the perspective of the front battery unit 110. The cam 352 in FIG. 11 is depicted as turned by rotation of the shaft 350 in relation to its angular position shown in FIG. 10. With the lobes in this relative "horizontal" position, an engaging lobe of the cam 352 displaces the spring 360 and the coil 364 to be cantilevered and compressed, respectively. The cam's lobe deflects the spring 360 towards the bottom sufficiently to electrically communicate with the busbar's connector 390.

The spring 360 and the busbar 370 may each be connected to one of the base's pair of connectors 390, as shown in FIGS. 10 and 11. The spring 360 and busbar 370 may represent complementary connections engaged and disengaged concurrently with each other by the rotating position of the cam 352.

Each combination of corresponding cam 352, spring 360 and busbar 370, whether along the bottom or top sides of the housing 340, may produce a switch to connect adjacent subpack assemblies 200 in electrical communication with the corresponding pair of connectors 390 on the base 330. The cams 352 may be aligned to connect selected groups of or all of the cell assemblies together.

The cam 352 depicted in FIGS. 10 and 11 have a pair of opposing radial extensions or lobes. However, this configuration is exemplary only, and other configurations can be envisioned within the scope of the claims. The cams 352 along the shaft 350 may have sundry configurations depending on the fraction of the subpack assemblies 200 to be electrically connected together.

For example, a first cam 352 may have one or more first lobes that align with a one or more second lobes on a second cam 352 so that both sets of lobes engage their counterpart springs 360 concurrently to concatenate power from a combined set of battery subpacks 200. Alternatively, the first cam 352 may have one or more third lobes that do not align with one or more fourth lobes on the second cam 352, to combine power from only a select portion of connected battery subpacks 200.

The secondary and tertiary busbars 380, 382 connect the remainder of the switching circuit in the switch assembly 300. Thus, the shaft 350 may be rotated through the keyhole 310 or the pneumatic actuator 320 to open or close the switch assembly's circuit on command. Turning the cam 352 to connect and disconnect the springs 360 with the busbar's connector 390 respectively closes and opens the switching circuit.

FIG. 12 shows the busbar 370, with its lower portion 372 being contained within the base 330 and the upper portion 374 extending across from the cam 352, both shown in FIG. 10 in situ. The busbar 370 includes a pair of mounting holes 376 into which the connector 390 may be disposed, one at either end 372, 374 of the busbar 370.

Figure 13:
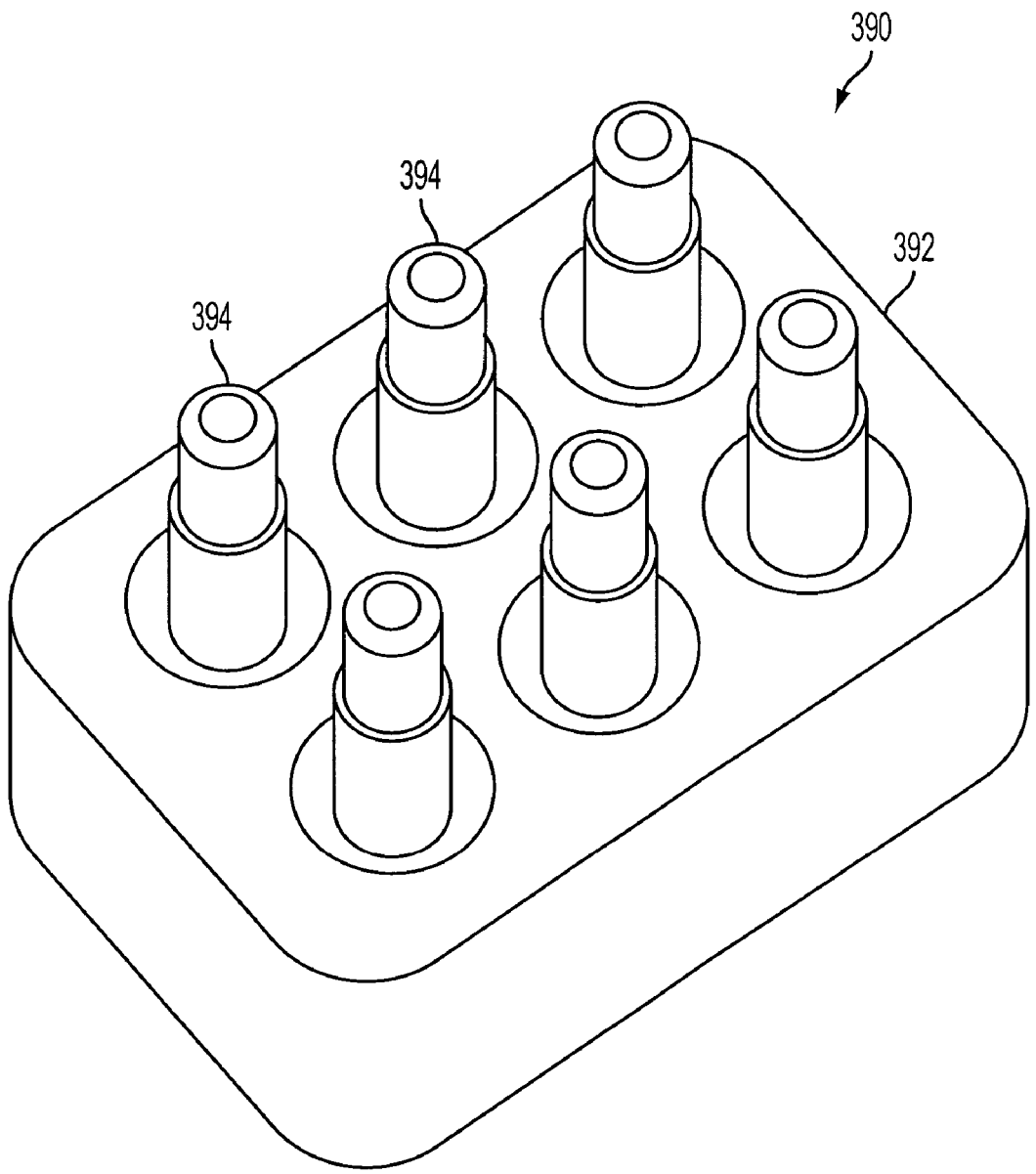
FIG. 13 is an isometric view of a contact assembly shown from the exposed side.
Figure 14:
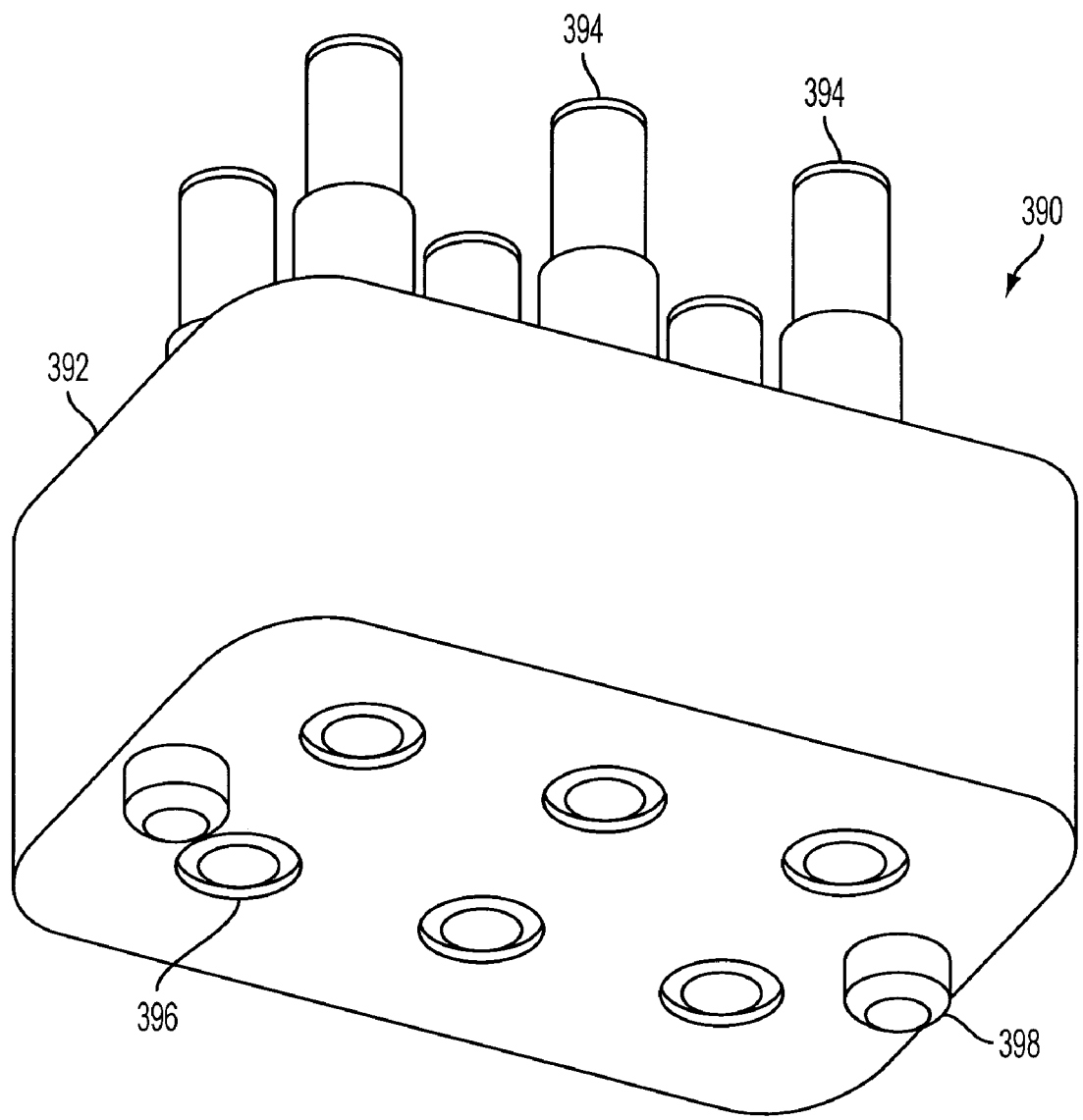
FIG. 14 is an isometric view of the contact assembly shown from the mounting side.

FIGS. 13 and 14 show an exemplary connector 390 from above and below, respectively. The connector 390 includes a brass block 392 with six contact pins 394 arranged in a 2×3 array. The pins 394 are inserted into corresponding countersunk through-holes 396. The pins 394 distribute electrical current from a device to which they electrically communicate and transmit the current by electrical conduction to the block 392 from which the current may be carried to complete a circuit.

The underside of the block 392 includes a pair of pegs 398 at the underside ends for insertion into mounting holes 376 of the busbar 370. Persons having ordinary skill in the art will recognize that the pattern and number of pins 394 within the block 392 are exemplary only, and that other configurations may be contemplated without departing from the scope of the invention.

Figure 15:
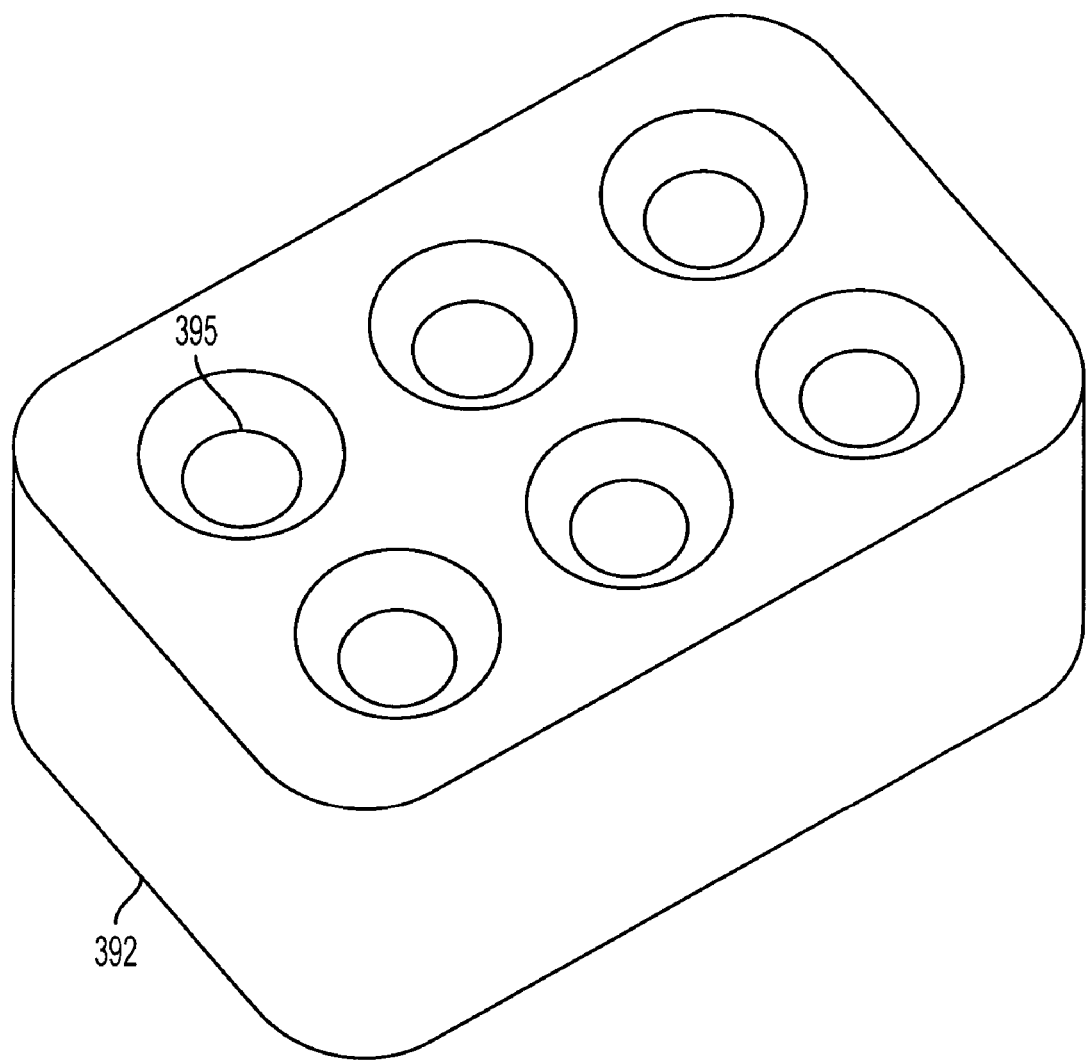
FIG. 15 is an isometric view of a contact block.
Figure 16:
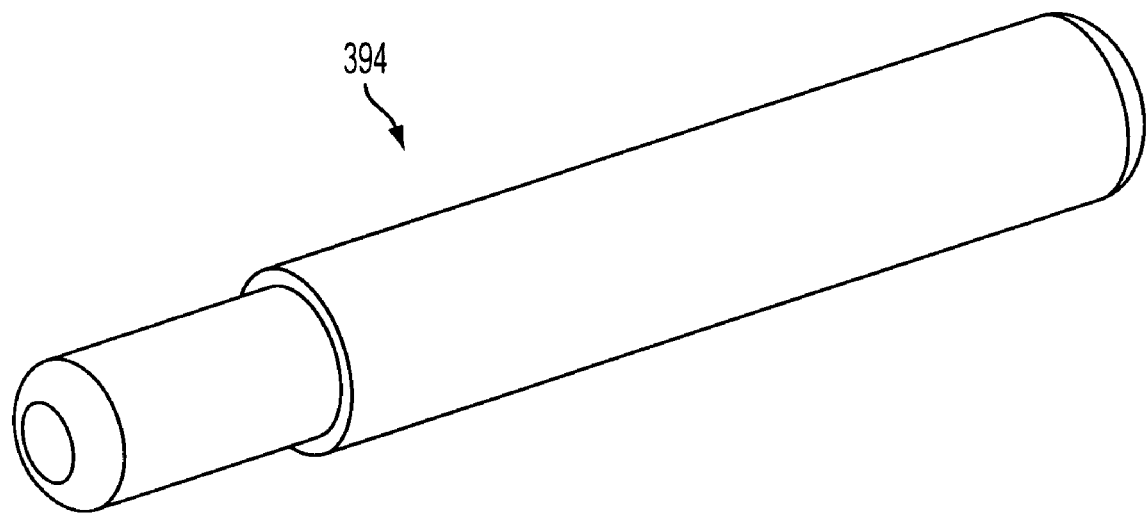
FIG. 16 is an isometric view of a contact pin.

FIG. 15 shows the block 392 with through-holes 396. FIG. 16 shows the pin 394, which contains a shaft within a hollow cylinder. An example commercial versions of the pin 394 is available as model 100045 battery contact probe from Interconnect Devices Inc. (IDI), of Kansas City, Kans.

This model probe for the pin 394 has a gold-plated nickel silver (Ni—Ag) barrel, a stainless steel spring and a gold-plated beryllium-copper plunger having a diameter of 0.045 inch and a travel length of 0.060 inch. The plunger may be deflected along its longitudinal axis for compression into the barrel to compensate proximate distance variations between components within mechanical tolerance. Its performance characteristics include operation at 3 A (amps) continuous (with 10 A intermittent peaks) and maximum resistance of 50 m$\Omega$). Assembled into the connector 390, the six pins 394 may channel current intermittently at about 40 A.

Figure 17:
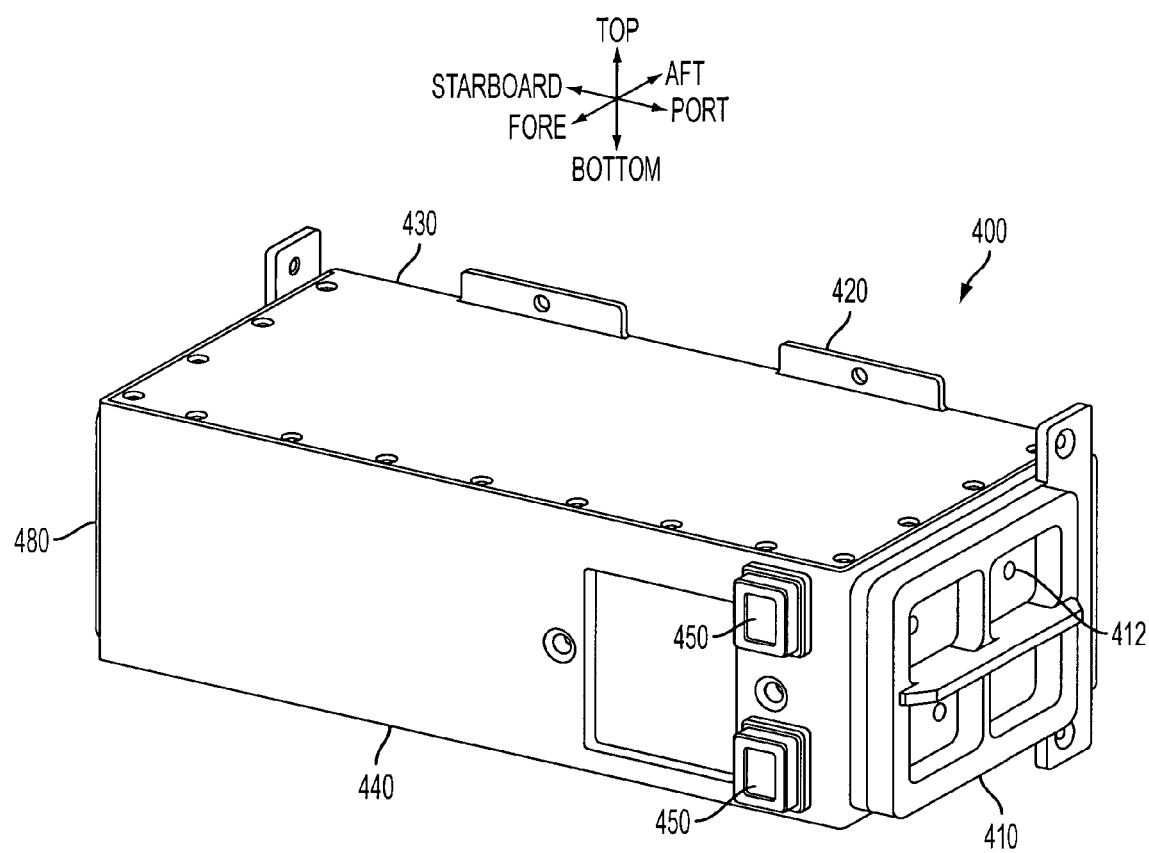
FIG. 17 is an isometric view of a power conditioner shown from the fore side of the front battery unit.

FIG. 17 illustrates a power conditioner 400 from the vantage of the fore side of the front battery unit 110. The power conditioner 400 includes a plastic external face 410 with terminals 412 from which to transmit electrical power for a designated and intended use. The external face 410 may be directed towards port side of the battery assembly 100.

A panel 420 on the reverse side of FIG. 17 (and more apparent in FIG. 4) faces towards the fore end of the front battery unit 110. A top cover 430 and an aluminum enclosure 440 shroud the conditioner's interior components. A pair of brass contacts 450 protrudes towards the fore direction opposite the panel 420 and is insulated from the enclosure 440 by plastic inserts.

Figure 18:
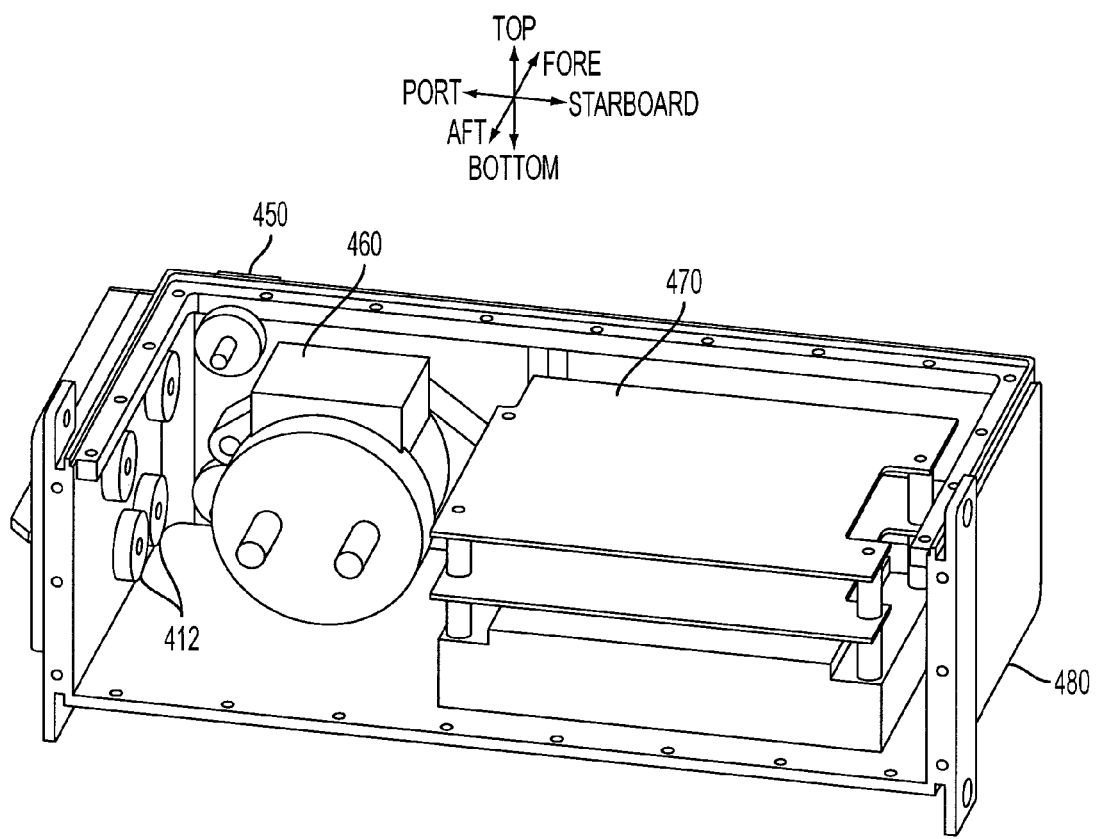
FIG. 18 is an isometric view of the power conditioner shown from the aft side of the front battery unit.

FIG. 18 shows the power conditioner 400 from the vantage of the aft side of the front battery unit 110. The cover 430 and a portion of the enclosure 440 are removed in FIG. 18 to show the interior components. In particular, the power conditioner 400 may include a module relay 460 and electronics 470.

An opposite panel 480 that faces towards starboard partially encloses the electronics 470. A signal from the opposite panel 480 may be transmitted through the electronics 470 and the relay 460 to provide power through the terminals 412 on the external face 410. The signal may also be employed to modulate a proportion of the total available power.

The switch assembly 300 operates to electrically connect the subpack assemblies 200 within each section pack 120 in both battery units 110 of the battery assembly 100. The combined electrical power from the subpack assemblies 200 may be channeled through the power conditioner 400.

As described supra, each subpack assembly 200 with thirty-five cells 260 connected together in series can provide 43.75 $V_{DC}$. Installed together within their respective section pack 120, the subpack assemblies 200 transmit no power unless the switch assembly 300 is engaged. The connectors 390 provide convenient and reliable distributed electrical conduits for channeling electrical power from the subpack assemblies 200.

Concatenated together by the switch assembly 300, each battery unit 110 can provide 350 $V_{DC}$. Consequently, the combined battery assembly 100 with a pair of switch assemblies 300 for their corresponding battery units 110 may provide 700 $V_{DC}$ safely and on command.

Electrical connection of the battery unit 110 may be commanded for activation or deactivation by a signal submitted to the pneumatic actuator 320. Manual override of such a command may be performed through the keyhole 310 using an appropriate tool.

The materials disclosed for particular components represent practical representative substances having appropriate structural, electrical, thermal and/or chemical properties for the applicable function. Artisans of ordinary skill will recognize that alternate materials may be selected for these components as optional design choices without any claim scope departure.

In general, while certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A battery assembly for electrical concatenation in series, the battery assembly comprising:

first and second battery packs, each battery pack including a plurality of rechargeable battery cells electrically connected in series;
a switch to electrically connect and disconnect the first and second battery packs together;
a receiver to transmit power from the switch; and
an actuator to operate the switch for connecting and disconnecting the battery packs, wherein the switch comprises:
first and second busses that electrically contact the respective first and second battery packs; and
a deflector that moves the first bus to electrically connect and disconnect with the second bus, the deflector having a shaft that axially rotates in response to the actuator, and a cam disposed along and rotating with the shaft to move the first bus to one of engagement and disengagement positions with a multi-contact connector disposed on the second bus.

2. The battery assembly according to claim 1, wherein the connector comprises:
a block having a plurality of openings, the block being electrically connectable to a terminal on the second bus; and
a plurality of contacts, each contact disposed into a corresponding opening of the plurality of openings.

3. The battery assembly according to claim 1, wherein the switch further comprises:
a third bus that electrically contacts the first and second buses to the receiver.

4. The battery assembly according to claim 2, wherein the each of the contacts of the connector comprises:
a sleeve that is disposable within the opening, the sleeve having an axis; and
a probe disposed within the sleeve and translatable along the axis in response to one of compression and tension, the probe at rest being in tension to extend partially from the sleeve.

5. The battery assembly according to claim 1, wherein the battery pack disposes the battery cells in a rectangular pattern.

6. The battery assembly according to claim 1, wherein the battery assembly disposes the first and second battery packs as among a plurality of battery packs arranged in linear groups.

* * * * *